Sept. 26, 1939.   S. T. SCHOFIELD   2,174,140
SEPARABLE FASTENER
Filed Aug. 24, 1938
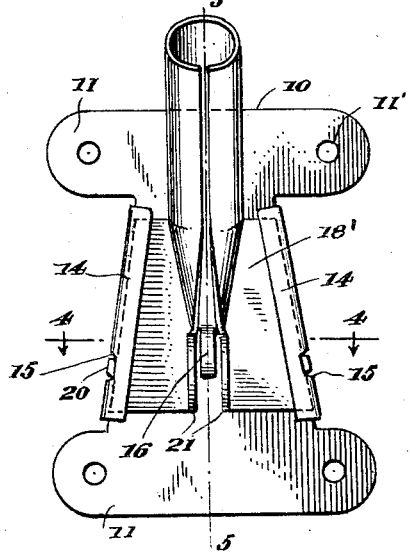
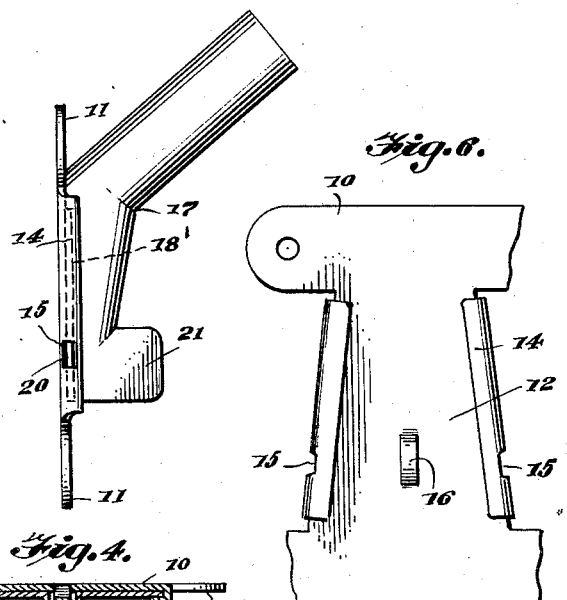
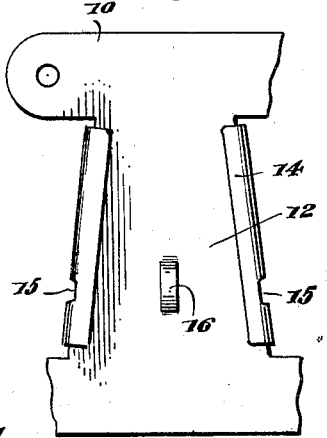
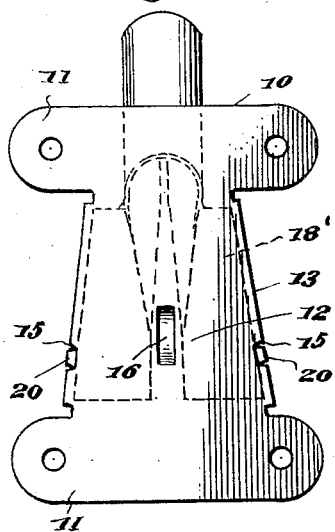
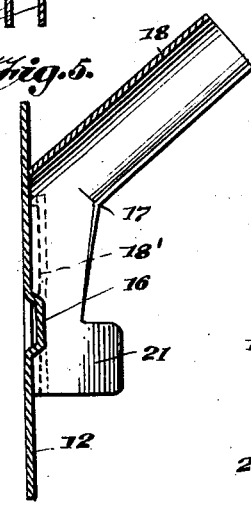
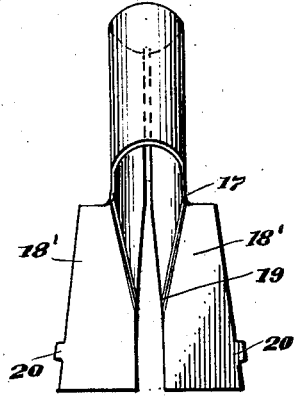
Inventor,
SAMUEL T. SCHOFIELD,
his Attorney.

Patented Sept. 26, 1939

2,174,140

UNITED STATES PATENT OFFICE 2,174,140

SEPARABLE FASTENER

Samuel T. Schofield, Washington, D. C.

Application August 24, 1938, Serial No. 226,529

4 Claims. (Cl. 248—224)

This invention relates to separable fasteners or bracket constructions adapted for holding detachably together any two members or elements which it is desired to hold assembled. The device of my invention has wide fields of application such as the holding of an operated member as a mop or a brush head detachably connected to its operating handle, this typifying any operating and operated members which are to be detachably held together,—another field of use being the detachable securing of any member to be held, such as a flag pole to a fixed socket. A principal object of the invention is to provide a separable fastener or bracket, the two parts of which are adapted for convenient and easy assemblage, or separation, and when so assembled they are rigidly and securely interlocked, providing an exceptionally strong and reliable connection. A further object is to provide a two-piece separable fastener, both of the parts of which are adapted to be cheaply and easily produced as metal stampings from ordinary sheet or plate metal. The foregoing and other objects and advantages of the invention will be better understood from the following detailed description taken in connection with the accompanying drawing and the distinctive features of novelty will be thereafter pointed out in the appended claims.

Referring to the drawing;

Figure 1 is a front view of a separable fastener embodying the invention with the two parts thereof assembled together;

Figure 2 is a rear view of the fastener;

Figure 3 is an edge view thereof;

Figure 4 is a transverse section on line 4—4 of Figure 1;

Figure 5 is a central lengthwise section on line 5—5 of Figure 1;

Figure 6 is an elevation showing one of the fastener elements and;

Figure 7 is an elevation showing the other fastener element.

10 indicates the socket or base member of the fastener which may be produced from sheet or plate metal of the requisite thickness for the desired strength. The end portions of this member are shown as somewhat laterally extended to provide apertured ears 11 through which screws or bolts may be passed for securing it to a head or base. The intermediate portion 12 of this member is made wedge shaped as indicated at 13 with its edges turned over as seen at 14 to provide a dove-tail or wedge shaped socket adapted to receive the other member of the fastener. The turned over edges 14 have small cut-outs 15 near the larger end of the dove-tail formation to receive projections on the other member of the fastener as presently explained. The dove-tail portion 12 also has produced centrally thereof and near its larger end a small struck-out hump or projection 16 for holding the other fastener member properly centered.

The other member 17 of the fastener is also preferably produced from a single piece of sheet or plate metal which should be somewhat resilient in character. One end portion of this piece is bent to constitute a socket 18 which may be approximately circular in cross section adapted to receive an operating handle, or to receive any member to be held such as a flag pole when the device is used to hold such a member fixedly in place. The other end portion of the member 17 is formed as two flat portions or wings 18' in the same plane and somewhat spaced apart as indicated at 19. These flat or wing portions 18' are adapted to fit into the dove-tail or wedge socket provided by the portion 12 of the other member and when so fitted in place small lugs or projections 20 on the outer edges of these wing members are adapted to snap into the cut-outs 15 of the other member; it being understood that the portions 18 are somewhat pressed toward each other resiliently as they are fitted into the wedge socket, the extensions from the socket portion 18 which merge into the wings 18', serving as a spring bow to provide such resiliency. Thus it is possible and practicable to provide for the requisite resiliency of the portions 18', even though the holder 18 when holding the handle or the like may not of itself provide such resilient action. The two wing, or flat portions 18' have ears 21 extending outwardly therefrom, these ears being disposed side by side and spaced apart a small distance as seen in Figure 1 so that they may be readily grasped between the thumb and finger to press the wing members 18' together for facilitating assemblage of these members in the socket, the lugs 20 being adapted to snap into the cut-outs 15 when the two parts of the fastener are in properly assembled relation, to hold them rigidly and securely together against looseness or displacement. When it is desired to open the fastener it is merely necessary to grasp the ears 21 and press them together which releases the lugs 20 from the cut-outs 15 whereupon the head member 17 may be readily removed from the socket member 10. In this operation, the hump 16 extending inward between the wing members 18' acts as a centering member and insures that both of the wings will be sprung inward so that both of the lugs 20 will be cleared of their respective cut-outs 15.

While I have shown the socket portion 18 which is adapted to receive the handle or the like, as extending diagonally outward at about a 45° angle, from the base, it will be understood that this is merely illustrative and that this socket formation may be made to extend at any desired angle, or straight out from the base if desired. In this and other respects the present embodiment of the invention is to be understood as illustrative and not restrictive as I am aware that the invention may be embodied in other specific forms without departing from the spirit or essential attributes thereof. I therefore desire the present embodiment to be considered in all respects as illustrative and not restrictive and refer to the appended claims rather than to the foregoing description to indicate the scope of the invention.

Having now described my invention, what I claim as new and desire to secure by Letters Patent is:

1. A separable bracket construction comprising a base member having a wedge shaped portion formed as a dove-tail socket, and a head member formed as a tubular receiver socket having spring portions extending diagonally endwise therefrom, adapted to be pressed into said dove-tail socket, said two portions having cooperative provision to constitute a spring snap lock when said head member is engaged in said socket.

2. A separable bracket construction as set forth in claim 1 wherein said spring portions are equipped with projecting hand pieces arranged adjacent each other and side by side so that they are adapted to be pressed toward each other to disengage said spring portions from the dove-tail socket.

3. A separable bracket construction comprising a base member having a wedge shaped portion formed as a dove-tail socket, and a head member having spring portions adapted to be pressed into said dove-tail socket, said two portions having cooperative provision to constitute a spring snap lock when said head member is engaged in said socket, said socket member and head member equipped with cooperative means to center the head member with respect to the socket member when it is sprung to clear said socket member.

4. A separable bracket construction comprising a plate formed as a base member with a wedge shaped portion having bent over edges to constitute a dove-tail socket with cut-outs in said bent over edges, and a one piece head member formed with one portion to constitute a tubular receiver for a handle, pole or the like, and having resilient wing portions extending from an end of said tubular receiver portion adapted to fit resiliently into said socket, and presenting projections adapted to snap into said cut-outs.

SAMUEL T. SCHOFIELD.